United States Patent [19]
Warnez et al.

[11] Patent Number: 5,904,367
[45] Date of Patent: May 18, 1999

[54] AIR BAG MODULE WITH FLOATING DOOR ATTACHMENT

[75] Inventors: Michael A. Warnez; Glenn F. Syrowik, both of Ortonville; Adelbert T. Czapp, Huntington Woods, all of Mich.

[73] Assignee: Chrysler Corporation, Auburn Hills, Mich.

[21] Appl. No.: 08/886,763

[22] Filed: Jul. 1, 1997

[51] Int. Cl.⁶ .................................................. B60R 21/20
[52] U.S. Cl. ...................................... 280/728.3; 280/732
[58] Field of Search .............................. 280/728.3, 728.2, 280/732

[56] References Cited

U.S. PATENT DOCUMENTS

| | | | |
|---|---|---|---|
| 4,917,524 | 4/1990 | Wilcox . | |
| 5,060,972 | 10/1991 | Satoh et al. ........................... | 280/728.3 |
| 5,145,207 | 9/1992 | Bederka et al. ...................... | 280/728.2 |
| 5,228,362 | 7/1993 | Chen et al. . | |
| 5,407,224 | 4/1995 | Bauer et al. ......................... | 280/728.2 |
| 5,439,246 | 8/1995 | Ravenberg et al. ................. | 280/728.3 |
| 5,456,488 | 10/1995 | Bauer .................................... | 280/728.2 |
| 5,538,277 | 7/1996 | Frary et al. .......................... | 280/728.3 |
| 5,564,732 | 10/1996 | Bauer et al. ......................... | 280/728.3 |
| 5,588,669 | 12/1996 | Leonard et al. ..................... | 280/728.3 |

*Primary Examiner*—Peter C. English
*Attorney, Agent, or Firm*—Kenneth H. Maclean

[57] ABSTRACT

An air bag module mounted in an instrument panel has an air bag adapted to deploy through an opening in the instrument panel. The air bag module comprises a canister adapted to contain the air bag, and a door extending across the open rear of the canister. The door closes the opening in the instrument panel but is adapted to open when the air bag deploys. The canister is attached to vehicle support structure and the door is attached to the instrument panel. The door and canister are connected together by upper and lower beads on the door received in upper and lower channels on the canister. The beads have a floating fit in the channels. Accordingly, the canister can be rigidly attached to the vehicle support structure and yet there is enough float to allow the door to be secured in proper position to the instrument panel. As a result, the fit and finish of the door in the opening can be virtually perfect.

4 Claims, 3 Drawing Sheets

AIR BAG MODULE WITH FLOATING DOOR ATTACHMENT

FIELD OF INVENTION

This invention relates generally to air bags and more particularly to an air bag module mounted in an opening in the instrument panel of an automotive vehicle.

BACKGROUND AND SUMMARY OF THE INVENTION

An air bag module for an automotive vehicle typically consists of a canister for containing a folded air bag and an inflator, and a door covering the open rear of the canister. The canister is secured to rigid vehicle support structure and the door is fitted in an opening in the instrument panel. One of the problems with present air bag modules is that the canister and door are fixedly connected together, so that it is not possible to make adjustments, even minor adjustments, in the position of the door to obtain a proper fit in the opening in the instrument panel.

In accordance with the present invention, the door is attached to the canister in a manner which will permit small adjustments. This enables the door to be fitted perfectly in the instrument panel opening.

In the construction about to be described, a floating connection is provided between the door and the canister. More specifically, the door has a bead disposed in a channel on the canister with a floating fit. The amount of float may vary, but a minimum of 2 millimeters is preferred. There may be two such channel and bead combinations.

In accordance with this construction, there is enough float to allow the door to be secured in proper position in the opening in the instrument panel and the canister to be rigidly attached to the vehicle support structure. The door may have integral pins along the top edge which fit into sockets provided in the instrument panel. The result is that the fit and finish of the door in the opening can be virtually perfect.

One object of this invention is to provide an air bag module having the foregoing features and capabilities.

Another object is to provide an air bag module and instrument panel combination which is composed of a relatively few simple parts, permits the door of the module to be fitted perfectly within the opening in the instrument panel, and is capable of being readily and inexpensively manufactured and assembled.

These and other objects, features and advantages of the invention will become more apparent as the following description proceeds, especially when considered with the accompanying drawings.

DETAILED DESCRIPTION OF THE PREFERRED EMBODIMENT

Figure 1:
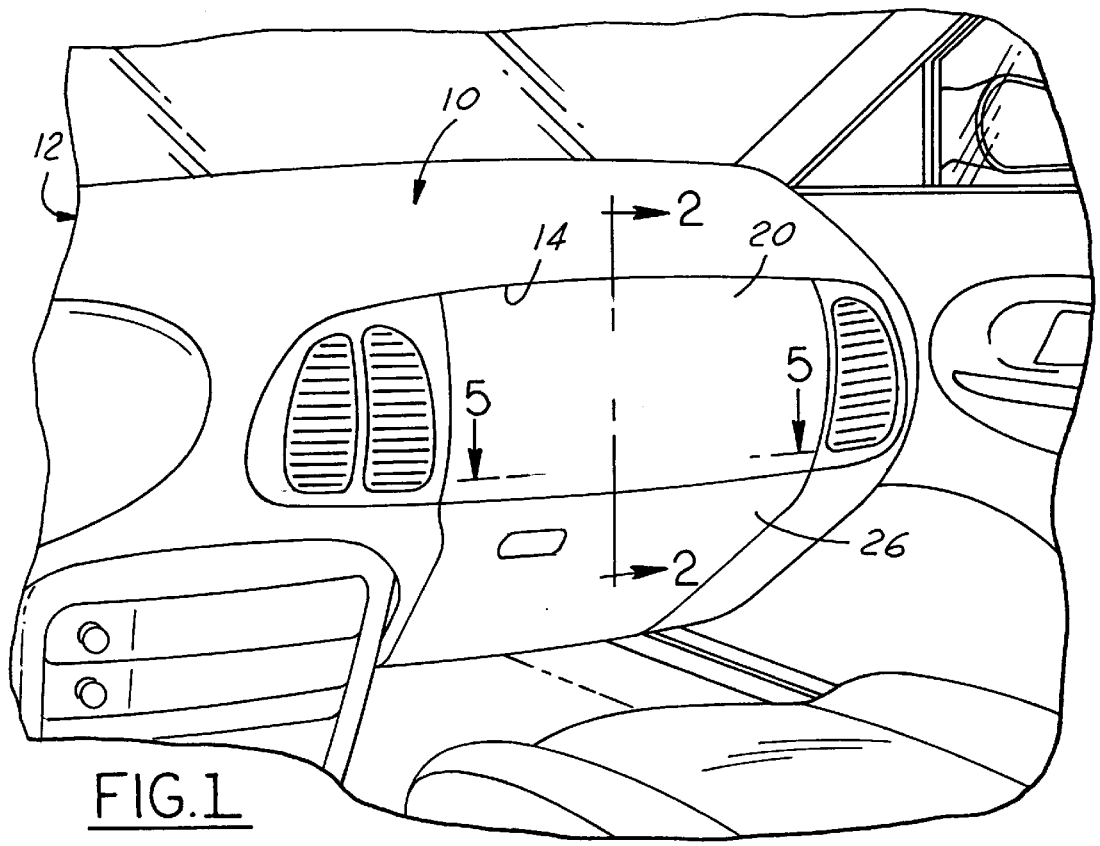
FIG. 1 is a perspective view of the passenger side of an instrument panel showing the door of an air bag module closing an opening in the instrument panel as seen from the inside of the vehicle, all constructed in accordance with the invention.
Figure 2:
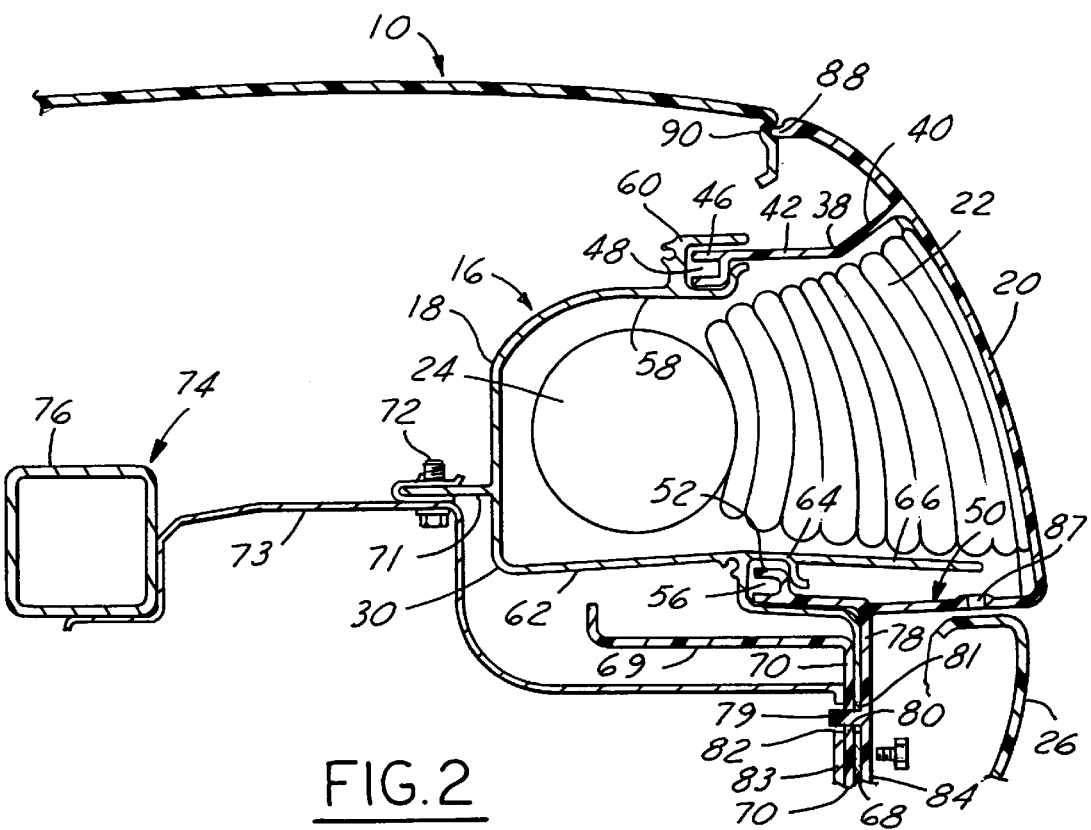
FIG. 2 is a sectional view taken on the line 2—2 in FIG. 1.
Figure 3:
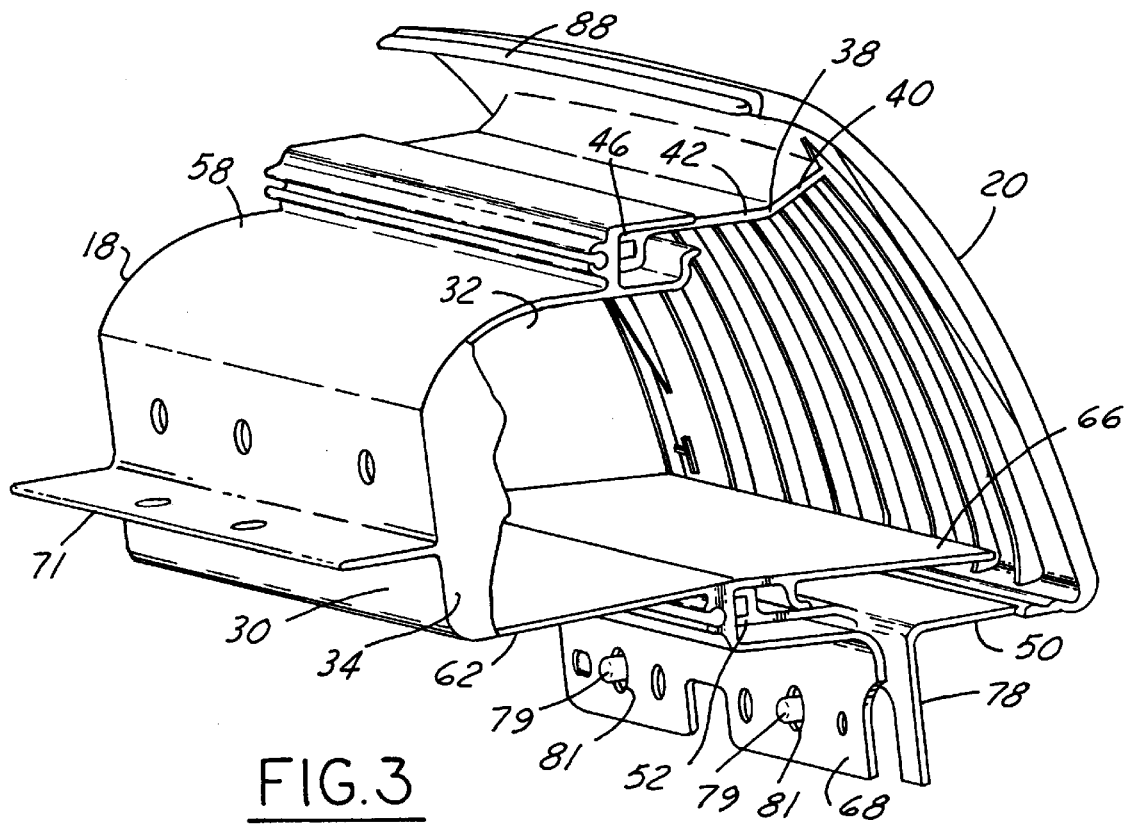
FIG. 3 is a perspective view of the air bag module with one end cap of the canister broken away and the inflator and folded air bag removed.
Figure 4:
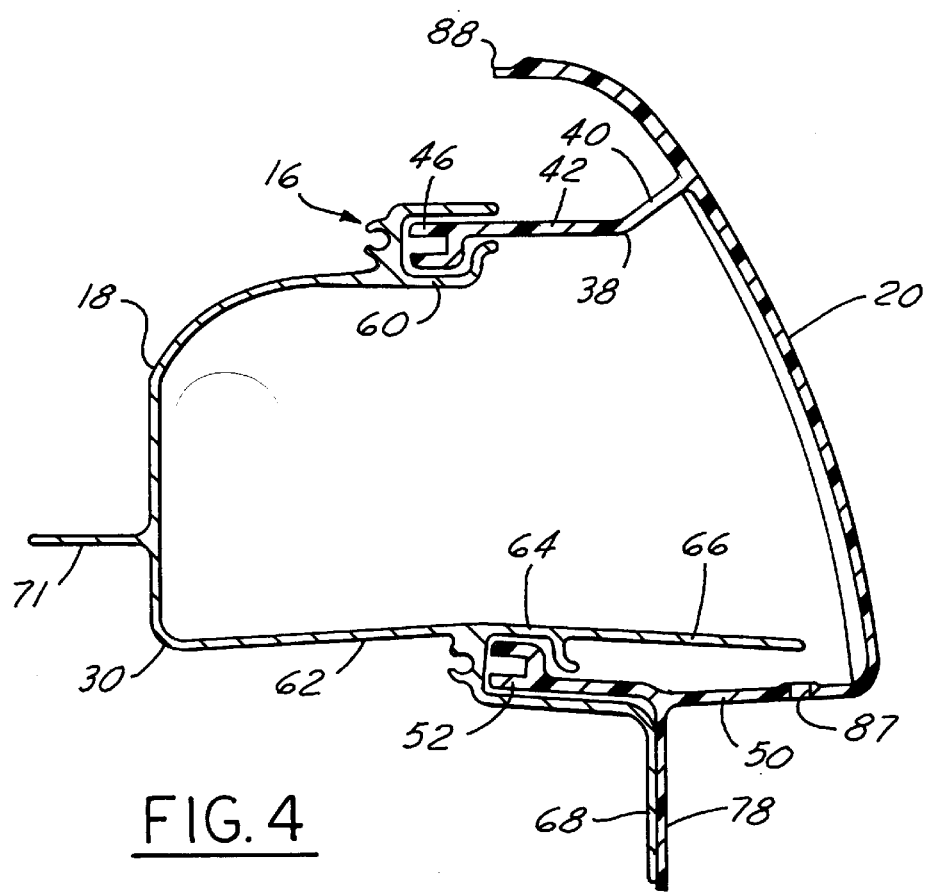
FIG. 4 is a sectional view of the air bag module which is similar to the showing thereof in FIG. 2 but taken in a different plane and with the inflator and folded air bag and instrument panel structure removed.
Figure 5:
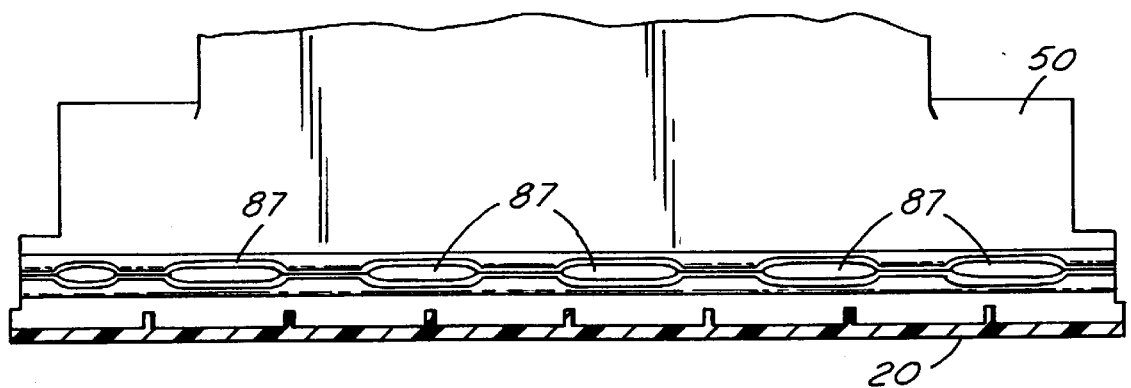
FIG. 5 is a sectional view taken on the line 5—5 in FIG. 1.

An instrument panel 10 is shown mounted in an automotive vehicle 12 and has a horizontally elongated opening 14 on the passenger side. An air bag module 16 is mounted in front of the instrument panel opening 14 and includes a canister 18 and a door 20. The canister contains an air bag 22 and an air bag inflator 24. The door extends across the open rear of the canister and closes the opening 14 in the instrument panel. The instrument panel has a glove box closed by a door 26.

The instrument panel and door are made of a suitable material such, for example, as a thermoplastic olefin.

The canister has a body 30 which is a generally C-shaped extrusion preferably made of aluminum. The canister has caps 32 and 34 which retain the ends of the canister.

The shape and dimensions of the door 20 match those of the opening 14 in the instrument panel in order to have a close fit therein. The door has an integral mounting strip 38 which extends the full width of the door and projects forwardly from a point near the upper edge of the door. The strip 38 has a rear portion 40 which extends perpendicular to the door and a front generally horizontal portion 42. The portion 42 of the strip 38 terminates at its front edge in an elongated, generally rectangular enlarged bead 46. The bead 46 extends the full length of the strip 38 and preferably is made with pockets 48 along its length to facilitate the molding thereof.

The door has a second, integral mounting strip 50 extending the full width of the door which projects forwardly from the lower edge thereof. The strip 50 terminates at its front edge in a second, elongated, generally rectangular enlarged bead 52. The bead 52 extends the full width of the strip 50 and, like the bead 46, has pockets 56 along its length to facilitate molding.

The canister body 30 has an upper generally horizontal wall 58 which extends in a rearward direction and at its rear edge terminates in an open-ended, generally rectangular elongated channel 60. The channel 60 extends the full width of the canister body and receives the bead 46.

The lower generally horizontal wall 62 of the canister body 30 has an open-ended, generally rectangular elongated channel 64 which extends the full width of the canister body and receives the bead 52. The beads 46 and 52 are slidable longitudinally in the channels 60 and 64. The beads are somewhat undersized, relative to the channels so that they may float vertically and horizontally. There is preferably at least 2 millimeters of both vertical and horizontal float for each bead.

The lower wall 62 of the canister body extends rearwardly from the channel 64 to provide a panel 66 for guiding the air bag when it deploys. A flange 68 integral with the channel 64 extends vertically downward beneath the canister. A wall 69 of the instrument panel has a vertical flange 70 in surface-to-surface contact with the front of the flange 68.

Along the front of the canister body there is an elongated generally horizontal flange 71 which is rigidly secured as by fasteners 72 to a panel 73 of the vehicle support structure 74. The panel 73 in turn is rigidly secured to a cross bar 76 of the vehicle support structure.

An integral vertical flange 78 extends downwardly from mounting strip 50 and is in surface-to-surface contact with the rear of the flange 68 on the canister. Integral locating pins 79 are molded to the flange 78 at spaced points along the width thereof and project in a forward direction. The pins 79 extend through locating holes 80 in the flange 70 of the instrument panel. Slots 81 and 82 in the flange 68 and a flange 83 of the panel 73 clear the pins 79. Fasteners 84 secure together the flanges 78, 68, 70 and 83.

Figure 6:
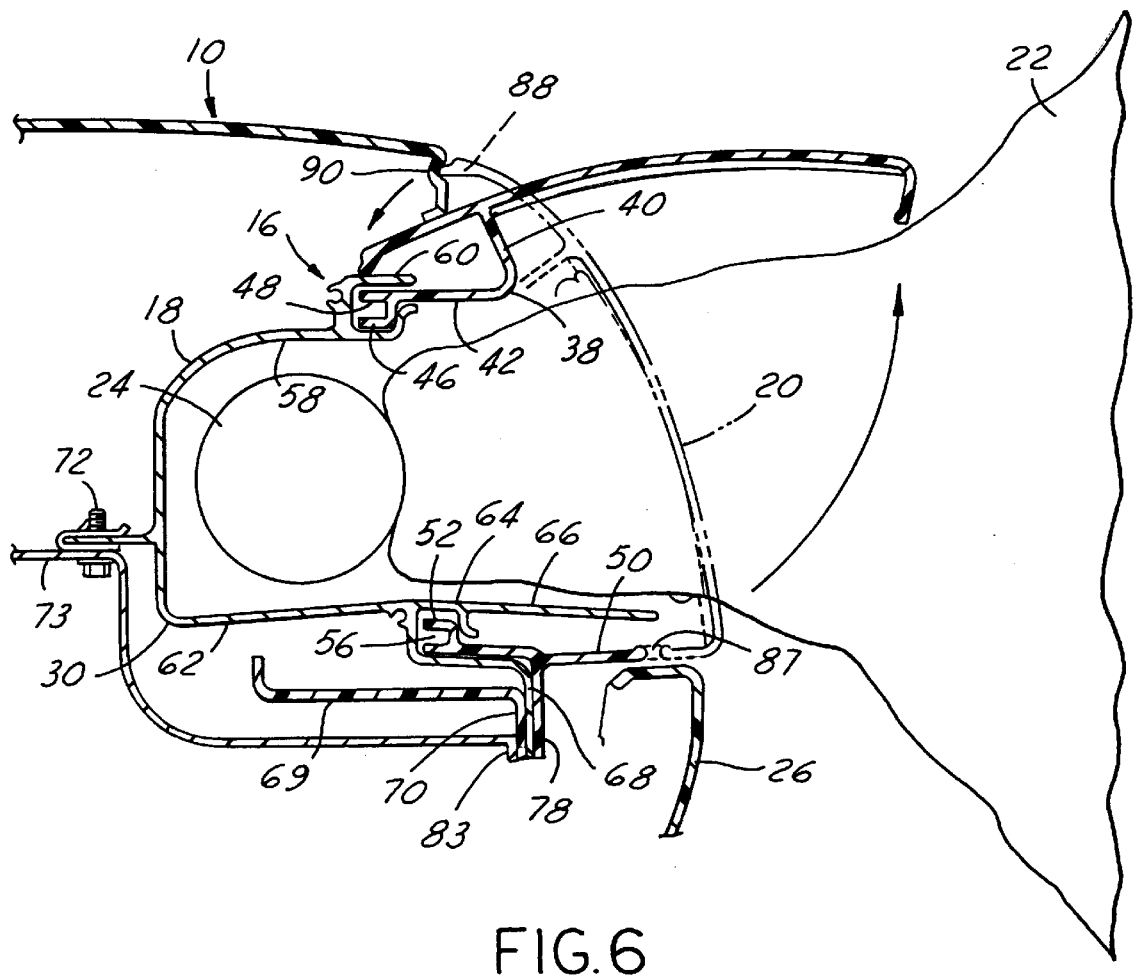
FIG. 6 is a sectional view similar to FIG. 2 but showing the door open in solid lines and closed in broken lines.

The mounting strip 50 between the flange 78 and the door is formed with a series of laterally spaced and aligned slots 87 from one side of the mounting strip to the other. The slots form a tear line which permits the strip 50 to tear and thereby enables the door to swing open to the FIG. 6 position under the impact of the expanding air bag upon deployment thereof.

The upper edge of the door is formed with an integral, elongated bead 88 which fits in an elongated groove 90 formed along the upper edge of the instrument panel opening 14.

The canister body 30 and door 20 are assembled to form the module 16 by sliding the beads 46 and 52 endwise into the channels 60 and 64.

In order to mount the air bag module 16 in the instrument panel 10, it is inserted through the opening 14 and initially the bead 88 along the upper edge of the door is engaged in the groove 90 in the upper edge in the instrument panel opening 14 to properly fit the door in the opening. The locating pins 79 on flange 78 on mounting strip 50 of the door are then inserted into the holes 80 in flange 70 of the instrument panel and slots 81 in flange 68 and slots 82 in flange 83. The door is sufficiently flexible to permit this. The fasteners 84 are then installed to secure the door in the proper position. Thereafter, the fasteners 72 are tightened to secure the canister to the panel 73 of the vehicle support structure. The beads 46 and 52 have sufficient vertical and horizontal float in the channels 60 and 64 and can slide longitudinally therein to permit both the door to be attached to the instrument panel in perfect position and the canister to be attached to the vehicle support structure. The float between the upper bead 46 and channel 60 is of primary importance to achieve a proper fit of the door in the instrument panel opening, although it is desirable to provide a similar float for the lower bead 52 in channel 64.

As a result of this construction, the fit and finish of the door 20 in the instrument panel opening 14 can be perfect.

We claim:

1. In combination, an air bag module and instrument panel for an automotive vehicle having vehicle support structure, said instrument panel having an opening, said air bag module comprising a canister having an open rear, said canister adapted to contain an air bag and including means attaching said canister to the vehicle support structure, said air bag module also comprising a door extending across the open rear of the canister, means attaching the door to the instrument panel in a position closing the opening therein, means connecting the door to the canister comprising an elongated channel on said canister and an elongated bead on said door received in said channel, said bead being longitudinally slidable in said channel and having a floating fit therein transversely thereof to facilitate attaching the canister to the vehicle support structure and the door to the instrument panel, said means connecting the door to the canister comprising a second elongated channel and a second elongated bead received in said second channel, said second bead being longitudinally slidable in said second channel and having a floating fit therein transversely thereof to facilitate attaching the canister to the vehicle support structure and the door to the instrument panel, the floating fit enabling a minimum transverse movement of said beads in said channels of 2 millimeters, said door having an upper edge portion provided with an elongated third bead, said instrument panel having an elongated groove receiving said third bead, and said door having a lower edge portion provided with a tear strip adapted to tear under the force of a deploying air bag to permit the door to open.

2. A combination as set forth in claim 1, wherein said tear strip is provided with a vertical flange extending downwardly therefrom, said instrument panel has a vertical flange extending alongside the vertical flange of said tear strip, locating pins on the vertical flange of said tear strip, and locating holes in the vertical flange of the instrument panel receiving said locating pins.

3. In combination, an air bag module and instrument panel for an automotive vehicle having vehicle support structure, said instrument panel having an opening, said air bag module comprising a canister having an open rear, said canister adapted to contain an air bag and including means attaching said canister to the vehicle support structure, said air bag module also comprising a door extending across the open rear of the canister, means attaching the door to the instrument panel in a position closing the opening therein, means connecting the door to the canister comprising an elongated channel on said canister and an elongated first bead on said door received in said channel, said first bead being longitudinally slidable in said channel and having a floating fit therein transversely thereof to facilitate attaching the canister to the vehicle support structure and the door to the instrument panel, said door having an upper edge portion provided with an elongated additional bead, said instrument panel having an elongated groove receiving said additional bead, and said door having a lower edge portion provided with a tear strip adapted to tear under the force of a deploying air bag to permit the door to open.

4. A combination as set forth in claim 3, wherein the floating fit enables a minimum transverse movement of said first bead in said channel of 2 millimeters.

\* \* \* \* \*